(12) United States Patent
Legros

(10) Patent No.: US 8,018,086 B2
(45) Date of Patent: Sep. 13, 2011

(54) HYBRID CONSTANT/VARIABLE FREQUENCY STARTER DRIVE

(75) Inventor: Craig R. Legros, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 185 days.

(21) Appl. No.: 12/467,483

(22) Filed: May 18, 2009

(65) Prior Publication Data
US 2010/0289328 A1 Nov. 18, 2010

(51) Int. Cl.
*B60L 1/00* (2006.01)
(52) U.S. Cl. ........................................ 307/9.1; 307/10.6
(58) Field of Classification Search .................... 307/9.1, 307/10.6
See application file for complete search history.

(56) References Cited

U.S. PATENT DOCUMENTS

| | | | |
|---|---|---|---|
| 6,699,151 B2 | 3/2004 | Grogg et al. | |
| 6,700,212 B2 | 3/2004 | Ackermann et al. | |
| 6,703,756 B2 | 3/2004 | Reutlinger | |
| 6,719,656 B2 | 4/2004 | Bowen | |
| 6,725,989 B1 | 4/2004 | Krisher et al. | |
| 6,733,411 B1 | 5/2004 | Kaplan et al. | |
| 6,838,778 B1 | 1/2005 | Kandil et al. | |
| 7,253,535 B2 | 8/2007 | Duesterhoeft | |
| 7,292,003 B1 | 11/2007 | Baker | |
| 2006/0043923 A1 | 3/2006 | Baker et al. | |
| 2006/0066112 A1 | 3/2006 | Geis et al. | |
| 2010/0133813 A1 | 6/2010 | Cote et al. | |

OTHER PUBLICATIONS

United Kingdom Search Report for UK Application No. GB1008307.9, Sep. 14, 2010.

*Primary Examiner* — Robert L. DeBeradinis
(74) *Attorney, Agent, or Firm* — Carlson, Gaskey & Olds, PC

(57) ABSTRACT

A power generation system and method uses a constant frequency generator to generate electrical power in a generate mode. When operating in a start mode, the constant frequency generator is controlled by a motor controller which at least partially controls another component while the system is in a generate mode. The power generation system and method can be implemented in, for example, an aircraft electrical architecture.

13 Claims, 2 Drawing Sheets

HYBRID CONSTANT/VARIABLE FREQUENCY STARTER DRIVE

BACKGROUND OF THE INVENTION

This application relates to an electrical generation system and method where a constant frequency generator is associated with a gas turbine engine and is capable of operating in both a start mode (as a starter) and a generate mode (as a generator).

Aircraft typically utilize gas turbine engines, which include turbine rotors that rotate to provide power. Generators are connected to each turbine engine in order to produce electrical energy, which is then utilized to power onboard electronic systems, as well as for other uses on the aircraft.

A system using a variable frequency generator and a constant frequency generator is described in U.S. patent application Ser. No. 12/406,992 to LeGros, and is hereby incorporated by reference. Typical systems constructed with the combined generator types described in the LeGros application utilize the variable frequency generator in a start mode where the generator acts as a motor and provides an initial motive force to rotate (start) the gas turbine engine. The variable frequency generator is also used in a generate mode, once the gas turbine engine has been started, to generate electrical power. The frequency of the generated electrical power varies depending on the speed of a rotor within the gas turbine engine.

The system described in the LeGros application also uses a constant frequency generator which functions only in generate mode, and is switched off during start mode. A constant frequency generator generates power having a constant frequency regardless of the rotor speed. One example constant frequency generator can be found in U.S. Pat. No. 6,838,778 to Kandil, et al., which is hereby incorporated by reference.

In order for a constant frequency generator, such as the one described in U.S. Pat. No. 6,838,778 to operate in a start mode, a torque converter, pony motor, and a two overrunning (start) clutches are included within the generator. In addition, a pony motor controller is required to power the pony motor which is within the constant frequency generator. The pony motor is used to get the constant frequency generator to synchronous speed, which then is transferred to an AC (main) bus. The torque converter is then allowed to fill with oil which allows the synchronous motor torque to provide a motive force to start the turbine engine. Many practical applications, such as an aircraft power generation system, require the minimization of the size and weight of each component. The addition of a torque converter and a pony motor runs contrary to this concept.

SUMMARY OF THE INVENTION

A generation system and method utilizes a constant frequency generator to generate electrical power. The generation system has a motor controller which controls the constant frequency generator while operating in a start mode. The motor controller is used to generate various controlled frequencies during generate mode. Also disclosed and claimed is an aircraft electrical architecture incorporating the above electrical generation system and method.

These and other features of the present invention can be best understood from the following specification and drawings, the following of which is a brief description.

DETAILED DESCRIPTION OF THE PREFERRED EMBODIMENT

Figure 1:
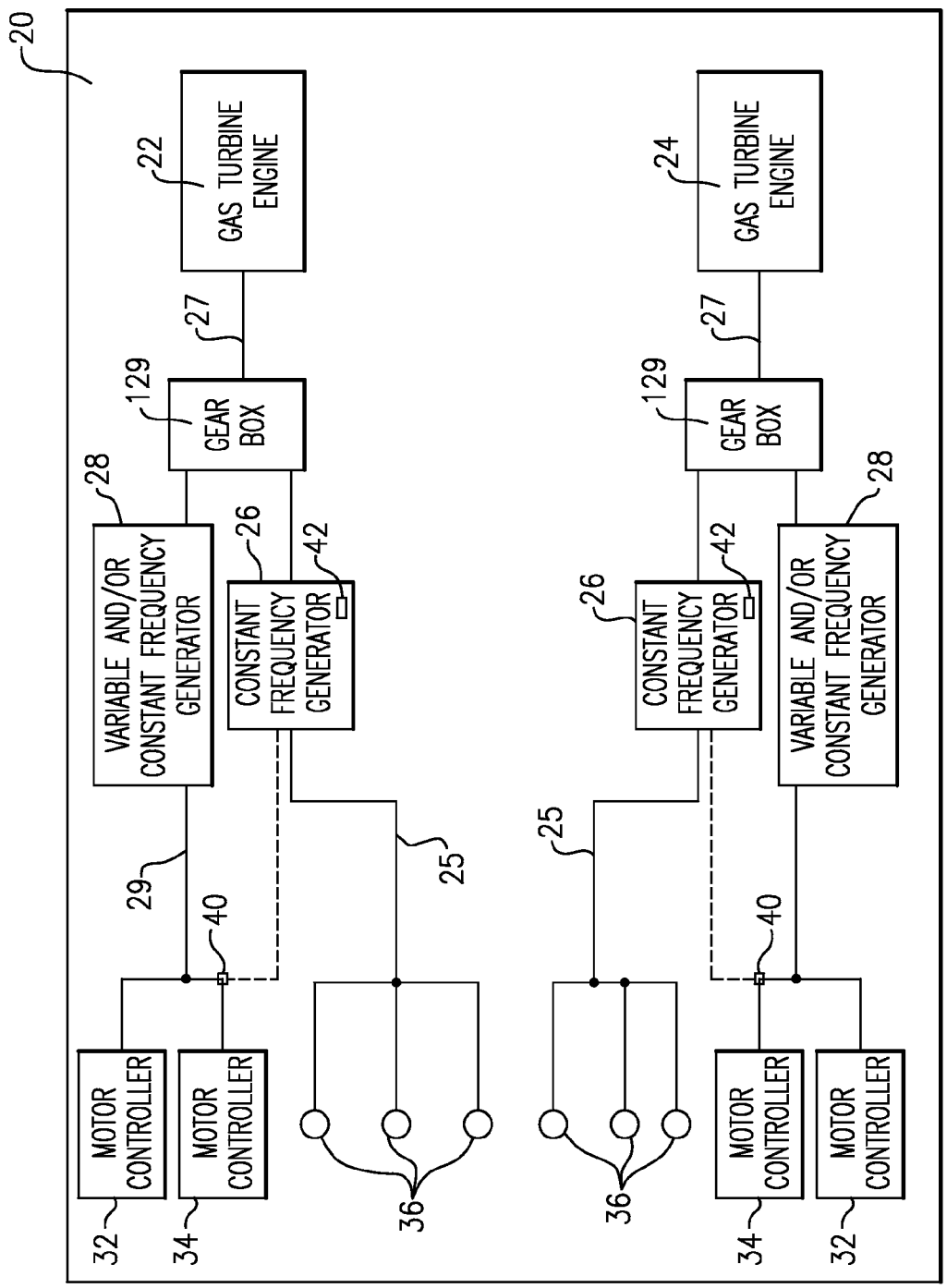
FIG. 1 schematically illustrates an aircraft incorporating the present invention, operating in a generate mode.

An aircraft 20 operating in a generate mode is schematically illustrated in FIG. 1, incorporating a pair of gas turbine engines 22 and 24. As known, the gas turbine engines 22, 24 include a turbine rotor that is driven to rotate by products of combustion. The rotation of the turbine rotor drives a shaft 27 which is connected to a gear box 129. The gear box 129 translates the rotational movement of the rotor to each of two different shafts which are connected to a variable frequency (and/or constant frequency) generator 28 and a constant frequency generator 26.

The variable frequency generator 28 is connected to two motor controllers 32, 34 via a power bus 29. The motor controllers 32, 34 provide control signals and power conversion necessary for the operation of the variable frequency generator 28 through the power bus 29. The power bus 29 additionally provides variable frequency power to electrical components of the aircraft, which do not need power to be maintained at a set frequency. Techniques for controlling a variable output frequency generator in a generate mode using multiple motor controllers are known in the art.

The constant frequency generator 26 is connected to electrical components 36 which require a constant frequency power source via power bus 25. As is known in the art, no control signals from the motor controllers 32, 34 are necessary for constant frequency generator 26 to operate as a generator during a generate mode.

Figure 2:
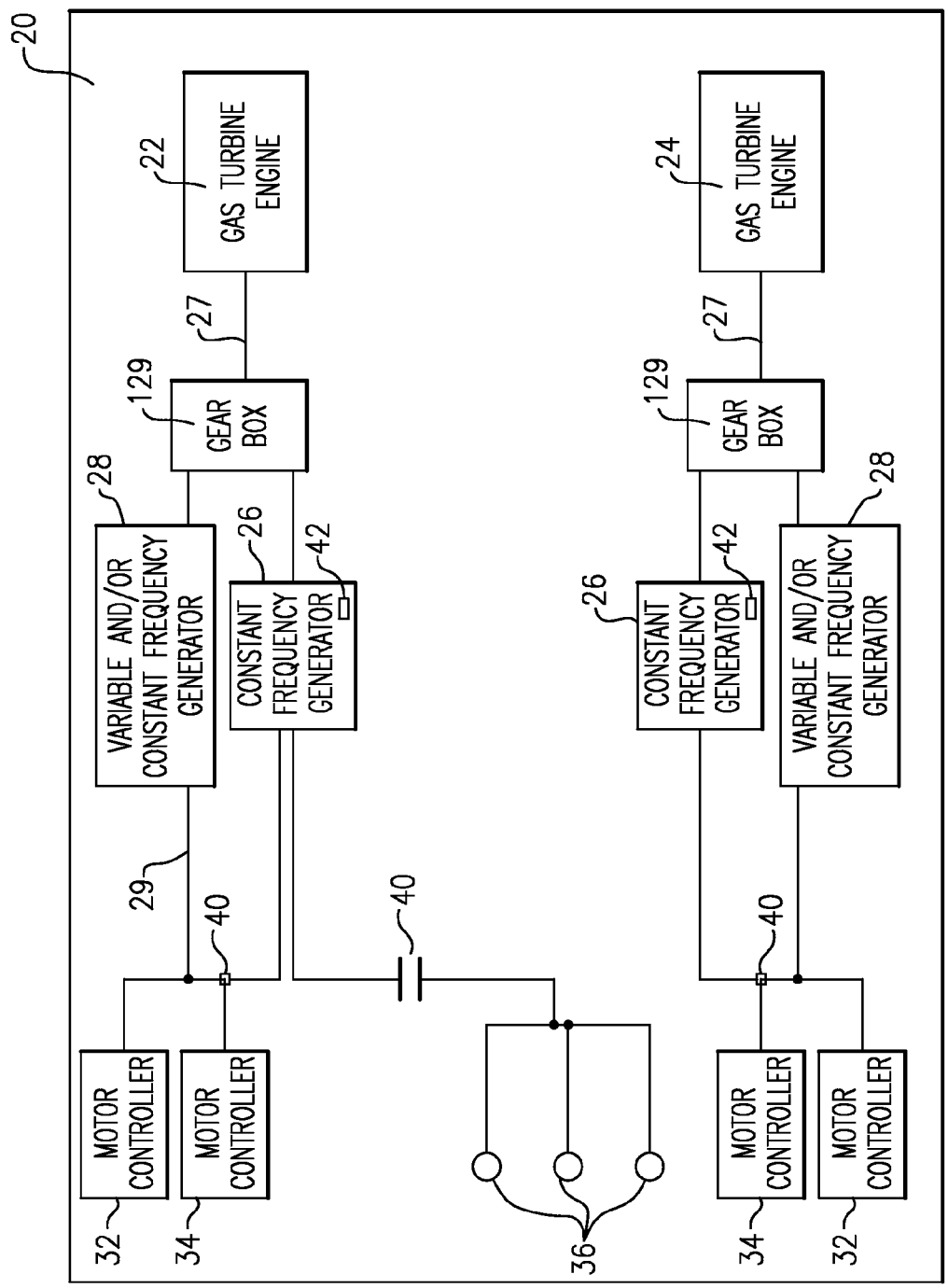
FIG. 2 schematically illustrates an aircraft incorporating the present invention, operating in a start mode.

When a turbine engine 22, 24 is initially starting, it is known to provide a motive force from the connected generators 28, and 26 (which act as motors during a start mode) to produce the force required to start the engine. FIG. 2 schematically illustrates an aircraft in a startup mode which utilizes both the variable frequency generator 28 and the constant frequency generator 26 to provide a motive force to the turbine engine 22, 24 without the additional inclusion of a torque converter. According to previously known techniques, a constant frequency generator 26 can only operate in a starter mode with the assistance of an additional torque converter acting in conjunction with a pony motor and two start clutches.

In order for the example illustrated in FIG. 2 to operate in the start mode, the constant frequency generator 26 includes a single overrunning (start) clutch 42 which is operable to bypass the constant speed device (CSD), which is used during generation mode. When a line contactor is energized, and electrical power thru the motor controller 34 is provided to the constant frequency generator 26, the constant frequency generator 26 will operate as a motor and provide a motive force to the shaft. The motor torque will be engaged through the overriding (start) clutch 42 to the input shaft. Once the engine is started, the line contactor 40 will be opened which will reconfigure the aircraft electrical bus to the generation mode as shown in FIG. 1.

The schematic of FIG. 2 illustrates one of the motor controllers 34, which is used to control the output frequency of the variable frequency generator 28 during generate mode, being connected to the constant frequency generator 26 during the start mode. One method of switching the motor controller's 34 connections, illustrated schematically in FIGS. 1 and 2, utilizes a mechanical switch (contactor) 40 to change the electrical bus connections. Other methods and systems for switching a motor controller's 34 connections are known in the art, and require minimal components. By connecting the already existing motor controller 34 to the constant frequency generator 26, the motor controller 34 can act in place of the torque converter, pony motor and pony motor controller configuration, which is required in all prior art systems, thereby eliminating components and reducing size and weight.

The second motor controller 34 is capable of acting as a start motor controller for item 26 during a start mode since it is otherwise idle during the start mode of the variable frequency generator 28. This allows for the elimination of the torque converter, one of the two over running (start) clutches, the pony motor and the pony motor controller from the electrical generation system, without requiring the torque converter or the pony motor to be replaced by new components, thereby reducing size and weight and improving efficiency of the overall system.

While an example utilizing a second variable frequency generator 28 motor controller 34 which is idle during a start mode has been disclosed above, it is known that alternate motor controllers which are present in the system and idle during a start mode could be used to control the constant frequency generator 26 during a start mode and fall within the above disclosure.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A generation system comprising:
   a constant frequency generator for taking rotation from a rotating member and generating power having a constant frequency; and
   a motor controller connected to said constant frequency generator, when said constant frequency generator is in a start mode, and connected to a second component when said constant frequency generator is in a generate mode.

2. The generation system of claim 1, wherein said constant frequency generator comprises a start clutch.

3. The generation system of claim 1, additionally comprising a switch connecting said motor controller to said constant frequency generator in a first position and connecting said motor controller to said second component in a second position.

4. The generation system of claim 1, wherein said second component comprises a variable frequency generator.

5. The generation system of claim 1, wherein said motor controller is disconnected from said constant frequency generator in said generate mode.

6. An aircraft electrical architecture comprising:
   at least one gas turbine engine, said gas turbine engine having a shaft and being associated with a constant frequency generator;
   said constant frequency generator being operable to take rotation of said shaft and generating power having a constant frequency in a generate mode, and operable to accept power and generate rotation of said shaft in a start mode; and
   a motor controller connected to said constant frequency generator in said start mode, said motor controller connected to a second component in said generate mode.

7. The aircraft electrical architecture of claim 6, wherein said constant frequency generator comprises a start clutch.

8. The aircraft electrical architecture of claim 6, additionally comprising a switch connecting said motor controller to said constant frequency generator in said start mode, and connecting said motor controller to said second component in said generate mode.

9. The aircraft electrical architecture of claim 6, wherein said second component comprises a variable frequency generator.

10. The aircraft electrical architecture of claim 6, wherein said motor controller is disconnected from said constant frequency generator in said generate mode.

11. A method for controlling a constant frequency generator comprising the steps of:
    connecting a motor controller to a constant frequency generator when said constant frequency generator enters a start mode;
    supplying electrical power to said constant frequency generator;
    engaging a start clutch when rotation of a rotor in said constant frequency generator exceeds a preset threshold; and
    disconnecting said motor controller from said constant frequency generator and connecting said motor controller to a second component when said constant frequency generator enters a generate mode.

12. The method of claim 11, wherein said step of disconnecting said motor controller from said constant frequency generator and connecting said motor controller to a second component comprises toggling a switch from a first switch mode to a second switch mode, said switch connecting said motor controller to said constant frequency generator in a first switch mode, and said switch connecting said motor controller to said second component in a second switch mode.

13. The method of claim 11, wherein said second component comprises a variable frequency motor.

\* \* \* \* \*